US012574790B2

(12) United States Patent      (10) Patent No.:    US 12,574,790 B2

Yuan et al.                      (45) Date of Patent:     Mar. 10, 2026

(54) REDUCING LATENCY OF EXTENDED REALITY (XR) APPLICATION USING HOLOGRAPHIC COMMUNICATION NETWORK AND MOBILE EDGE COMPUTING (MEC)

(71) Applicant: SAMSUNG ELECTRONICS CO., LTD., Suwon-si (KR)

(72) Inventors: Dun Yuan, Montreal (CA); Abu Zafar Ekram Hossain, Winnipeg (CA); Di Wu, Laurent (CA); Xue Liu, Montreal (CA); Gregory Lewis Dudek, Westmount (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 29 days.

(21) Appl. No.: 18/591,822

(22) Filed: Feb. 29, 2024

(65) Prior Publication Data

US 2024/0422611 A1     Dec. 19, 2024

Related U.S. Application Data

(60) Provisional application No. 63/521,047, filed on Jun. 14, 2023.

(51) Int. Cl.
| | |
|---|---|
| *H04W 28/02* | (2009.01) |
| *H04L 43/0811* | (2022.01) |
| *H04L 43/0852* | (2022.01) |
| *H04L 47/80* | (2022.01) |

(52) U.S. Cl.
CPC ..... *H04W 28/0236* (2013.01); *H04L 43/0811* (2013.01); *H04L 43/0858* (2013.01); *H04L 47/801* (2013.01); *H04L 47/803* (2013.01)

(58) Field of Classification Search
CPC .... H04L 43/0852; H04L 67/10; H04L 47/803
See application file for complete search history.

(56) References Cited

U.S. PATENT DOCUMENTS

| | | | | |
|---|---|---|---|---|
| 10,229,533 | B2 * | 3/2019 | Tian ...................... | G06T 17/10 |
| 2019/0116372 | A1 * | 4/2019 | Cohen ................... | H04N 19/44 |
| 2021/0006614 | A1 * | 1/2021 | Oyman ................. | H04N 19/30 |
| 2021/0201437 | A1 | 7/2021 | Yerli et al. | |
| 2021/0400568 | A1 * | 12/2021 | Chaysinh .............. | H04W 36/13 |
| 2022/0285009 | A1 * | 9/2022 | Sha .......................... | G06T 3/14 |

FOREIGN PATENT DOCUMENTS

KR       10-2577189 B1     9/2023

* cited by examiner

*Primary Examiner* — Tonia L Dollinger
*Assistant Examiner* — Linh T. Nguyen
(74) *Attorney, Agent, or Firm* — Sughrue Mion, PLLC

(57) ABSTRACT

A method performed by an electronic device of a wireless communication system, includes: receiving, from a first user, points of a cloud related to an application; receiving, from a plurality of mobile edge computing (MEC) servers, a plurality of computing capacities of the plurality of MEC servers; estimating a total latency of the wireless communication system, based on the points of the cloud and the plurality of computing capacities; performing a first operation of minimizing a maximum latency among a plurality of users comprising the first user, based on the total latency; performing a second operation of minimizing a number of splits of the points, based on the minimized maximum latency; performing a splitting of the points to a plurality of subsets and allocating the plurality of subsets to the plurality of MEC servers, respectively.

16 Claims, 7 Drawing Sheets

TABLE I
NOTATIONS

| Symbol | Description |
|---|---|
| $M$ | Set of MEC servers |
| $N$ | Set of teleported users |
| $b_{m,n}$ | Bandwidth of link $(m, n)$ |
| $b_{m_1, m_2}$ | Bandwidth of link $(m_1, m_2)$ |
| $l_n$ | Latency for teleported user $n$ on UE |
| $K$ | Set of data classes |
| $C$ | Set of computing operations |
| $s_k$ | Size of a data in class $k$ |
| $t$ | Number of splits by cloud scheduler |
| $p_{k,c,m}$ | MEC $m$'s computing capacity of processing a class-$k$ data with operation $c$ |
| $A_{k,c}[t]$ | Number of computing tasks to process class-$k$ data with operation $c$ |

FIG. 4

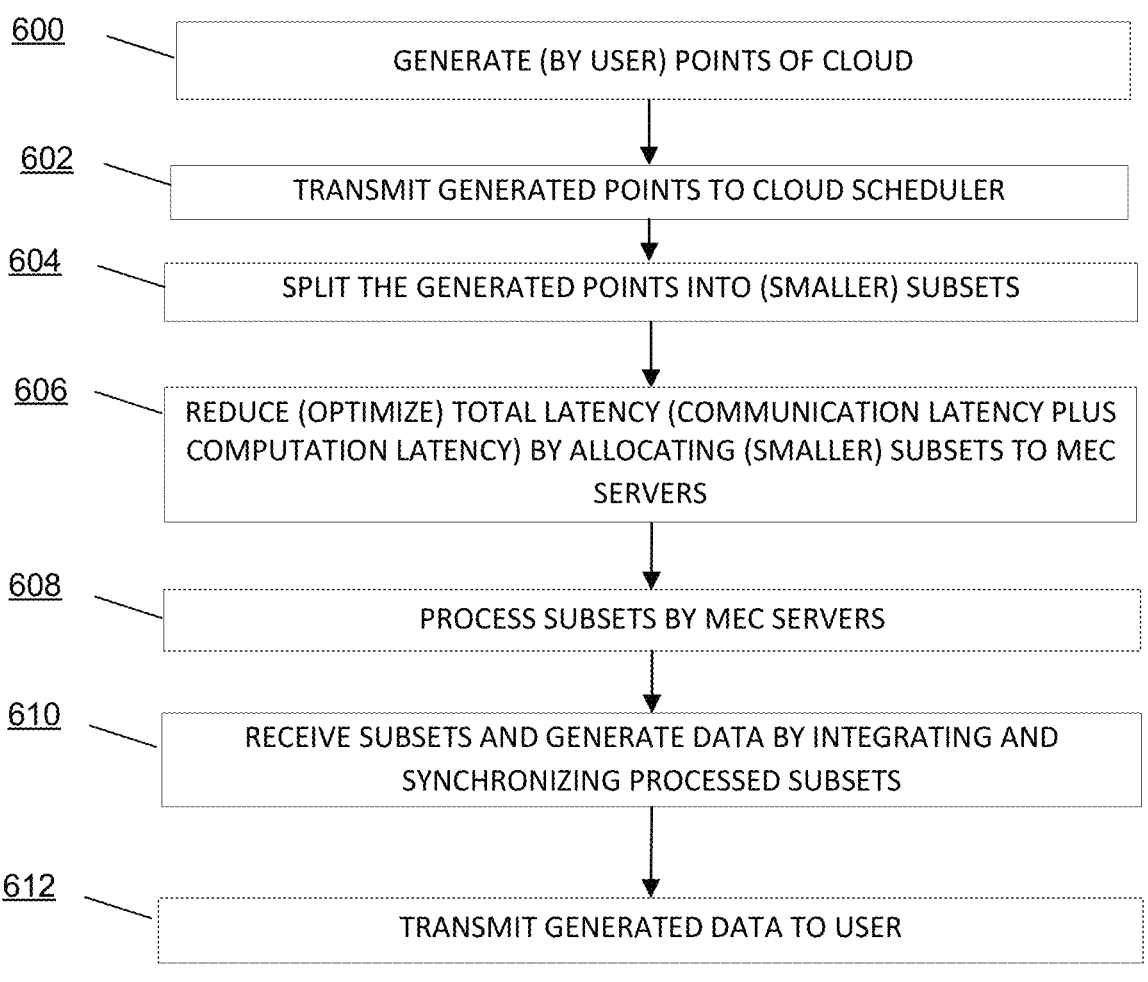

600     GENERATE (BY USER) POINTS OF CLOUD

602     TRANSMIT GENERATED POINTS TO CLOUD SCHEDULER

604     SPLIT THE GENERATED POINTS INTO (SMALLER) SUBSETS

606     REDUCE (OPTIMIZE) TOTAL LATENCY (COMMUNICATION LATENCY PLUS COMPUTATION LATENCY) BY ALLOCATING (SMALLER) SUBSETS TO MEC SERVERS

608     PROCESS SUBSETS BY MEC SERVERS

610     RECEIVE SUBSETS AND GENERATE DATA BY INTEGRATING AND SYNCHRONIZING PROCESSED SUBSETS

612     TRANSMIT GENERATED DATA TO USER

FIG. 6

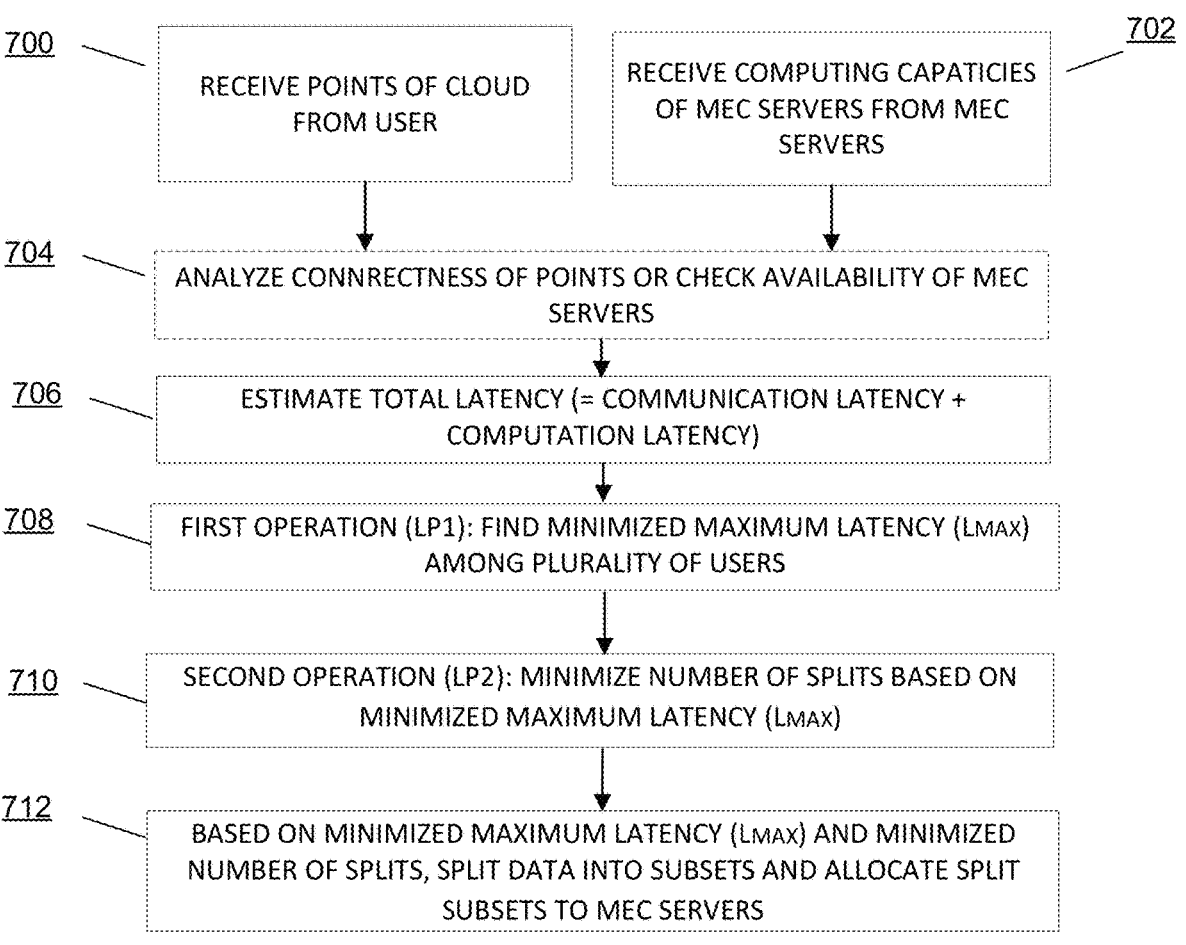

700

RECEIVE POINTS OF CLOUD FROM USER

702

RECEIVE COMPUTING CAPATICIES OF MEC SERVERS FROM MEC SERVERS

704

ANALYZE CONNRECTNESS OF POINTS OR CHECK AVAILABILITY OF MEC SERVERS

706

ESTIMATE TOTAL LATENCY (= COMMUNICATION LATENCY + COMPUTATION LATENCY)

708

FIRST OPERATION (LP1): FIND MINIMIZED MAXIMUM LATENCY ($L_{MAX}$) AMONG PLURALITY OF USERS

710

SECOND OPERATION (LP2): MINIMIZE NUMBER OF SPLITS BASED ON MINIMIZED MAXIMUM LATENCY ($L_{MAX}$)

712

BASED ON MINIMIZED MAXIMUM LATENCY ($L_{MAX}$) AND MINIMIZED NUMBER OF SPLITS, SPLIT DATA INTO SUBSETS AND ALLOCATE SPLIT SUBSETS TO MEC SERVERS

FIG. 7

REDUCING LATENCY OF EXTENDED REALITY (XR) APPLICATION USING HOLOGRAPHIC COMMUNICATION NETWORK AND MOBILE EDGE COMPUTING (MEC)

CROSS-REFERENCE TO RELATED APPLICATION

This application is based on and claims priority under 35 U.S.C. § 119 to U.S. Provisional Patent Application No. 63/521,047, filed on Jun. 14, 2023, in the United States Patent and Trademark Office, the disclosure of which is incorporated by reference herein in its entirety.

BACKGROUND

1. Field

The disclosure relates to a system and a method for reducing a latency in extended reality (XR) applications using communication networks such as a cloud scheduler and mobile edge computing servers.

2. Description of Related Art

Holographic communication is an advanced form of extended reality (XR) technology that involves the real-time capturing, encoding, transporting, and rendering of three-dimensional (3D) representations of people, objects, or environments. For XR, 3D objects are captured using multiple cameras or depth-sensing devices, which generate a volumetric representation of the object. Then, the volumetric data is encoded using efficient compression techniques to reduce a bandwidth required for transmission over networks like fifth generation (5G) networks. Once the data is transmitted, the data is decoded and rendered on the user's display device, creating a realistic, immersive 3D holographic experience. 3D holographic communication allows users to interact with the virtual content as if the virtual content were physically present, fostering a more natural and engaging communication. The seamless integration of holographic communication into XR applications such as virtual reality (VR), augmented reality (AR), and mixed reality (MR) dramatically enhances the user experience by providing high realism, depth perception, and interactivity.

High data rates and computational demands associated with 3D holographic communication impose significant challenges on the underlying communication networks, particularly a latency, which can degrade the quality of holographic content, leading to poor user experience and so-called 'uncanny valley effect,' a phenomenon where a user perceives the holographic representations as eerie or unsettling due to slight imperfections or inconsistencies. Thus, addressing the latency is crucial for ensuring seamless and real-time holographic experiences.

One solution to minimize or reduce the latency is to use Mobile Edge Computing (MEC) servers in communication networks. A MEC server brings cloud computing resources closer to the end-users by offloading computation tasks from User Equipments (UEs) to the MEC server. This scheme reduces the communication latency and allows for more efficient utilization of the available computational resources, leading to reduce the latency. Nevertheless, to fully harness the benefits of the MEC server in communication networks, specialized operations for job scheduling and resource allocation are required.

SUMMARY

Provided are systems and methods for reducing or minimizing a latency of an application by using a cloud scheduler and MEC servers in communication networks. Examples of fields in which the application is used are extended reality (XR), virtual reality (VR), augmented reality (AR), and mixed reality (MR).

According to one aspect of the disclosure, an electronic device of a wireless communication system, includes: at least one processor; and at least one memory comprising computer program code, wherein the at least one memory and the computer program code are configured, with the at least one processor, to cause the electronic device to at least: receive, from a first user, points of a cloud related to an application; receive, from a plurality of mobile edge computing (MEC) servers, a plurality of computing capacities of the plurality of MEC servers; estimate a total latency of the wireless communication system, based on the points of the cloud and the plurality of computing capacities; perform a first operation of minimizing a maximum latency ($l_{max}$) among a plurality of users comprising the first user, based on the total latency; perform a second operation of minimizing a number of splits of the points, based on the minimized maximum latency ($l_{max}$); based on the minimized maximum latency ($l_{max}$) and the minimized number of splits, perform a splitting of the points to a plurality of subsets and allocate the plurality of subsets to the plurality of MEC servers, respectively.

According to an aspect of the disclosure, a method performed by an electronic device of a wireless communication system, includes: receiving, from a first user, points of a cloud related to an application; receiving, from a plurality of mobile edge computing (MEC) servers, a plurality of computing capacities of the plurality of MEC servers; estimating a total latency of the wireless communication system, based on the points of the cloud and the plurality of computing capacities; performing a first operation of minimizing a maximum latency ($l_{max}$) among a plurality of users comprising the first user, based on the total latency; performing a second operation of minimizing a number of splits of the points, based on the minimized maximum latency ($l_{max}$); based on the minimized maximum latency ($l_{max}$) and the minimized number of splits, performing a splitting of the points to a plurality of subsets and allocating the plurality of subsets to the plurality of MEC servers, respectively.

According to an aspect of the disclosure, a method performed by a wireless system comprising a user, a cloud scheduler, a plurality of mobile edge computing (MEC) servers, and a user equipment, includes: generating, by the user, data related to an application; offloading, by the user, the data to the cloud scheduler; splitting, by the cloud scheduler, the data into sub-tasks, based on at least one of a network condition, computational capabilities of the plurality of MEC servers, or a requirement of the application; allocating, by the cloud scheduler, the sub-tasks to the plurality of MEC servers, based on at least one operation of minimizing a latency of the application; processing, by the plurality of MEC servers, the sub-tasks; integrating, by at least one of the plurality of MEC servers, the sub-tasks processed by the plurality of MEC servers; and transmitting, by the at least one of the plurality of MEC servers, the integrated sub-tasks to the user equipment.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 illustrates Table 1 showing notations used in the disclosure;

FIG. 6 illustrates example operations performed by the system the user, the cloud scheduler, and the MEC server in accordance with some embodiments of the disclosure; and FIG. 7 illustrates a first set of example operations performed by the cloud scheduler in accordance with some embodiments of the disclosure.

DETAILED DESCRIPTION

Figure 1:
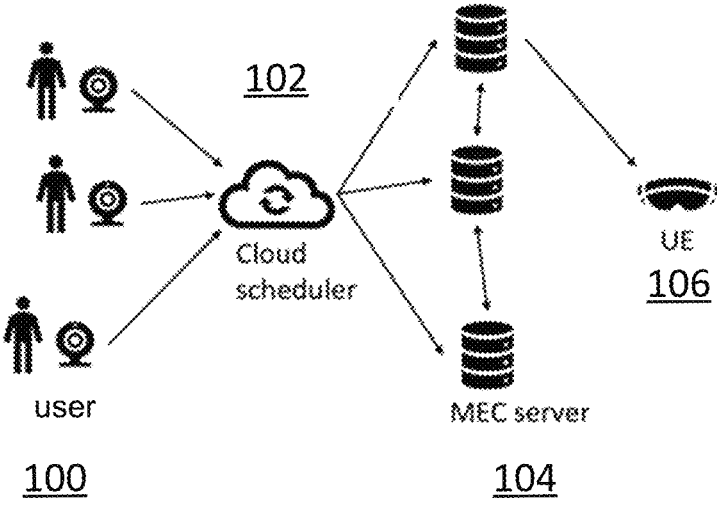
FIG. 1 illustrates a communication network in accordance with embodiments of the disclosure.

The terms as used in the disclosure are provided to merely describe specific embodiments, not intended to limit the scope of other embodiments. Singular forms include plural referents unless the context clearly dictates otherwise. The terms and words as used herein, including technical or scientific terms, may have the same meanings as generally understood by those skilled in the art. The terms as generally defined in dictionaries may be interpreted as having the same or similar meanings as or to contextual meanings of the relevant art. Unless otherwise defined, the terms should not be interpreted as ideally or excessively formal meanings. Even though a term is defined in the disclosure, the term should not be interpreted as excluding embodiments of the disclosure under circumstances.

According to one or more embodiments, the electronic device may be one of various types of electronic devices. In some embodiments of the disclosure, the electronic devices may include or correspond to a "radio access node," a "radio network node," a "radio access network node," a "core network node," or a "communication device."

As used herein, the "radio access node," the "radio network node," or the "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (e.g., Next-Generation Node B (gNB)) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

As used herein, the "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

As used herein, the "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, handheld, computer-comprised, or vehicle-mounted mobile device, enabled to communicate voice and/or data via a wireless or wireline connection.

One type of the "communication device" is a wireless communication device, which may be any type of wireless device that has access to (i.e., is served by) a wireless network (e.g., a cellular network). Some examples of a wireless communication device include, but are not limited to: a UE in a 3GPP network, a Machine Type Communication (MTC) device, and an Internet of Things (IoT) device. Such wireless communication devices may correspond to or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, handheld, computer-comprised, or vehicle-mounted mobile device, enabled to communicate voice and/or data via a wireless connection.

The disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

FIG. 1 illustrates a communication network according to some embodiments of the disclosure. For example, the communication network corresponds to an edge computing-assisted 3D holographic communication network.

As shown in FIG. 1, according to some embodiments of the disclosure, the communication network includes users 100, a cloud scheduler 102, MEC servers 104, and a UE 106. The users 100 generate (holographic communication) tasks, which are then offloaded to the cloud scheduler 102. Based on operations of the disclosure, the cloud scheduler 102 allocates the tasks to the MEC servers 104 for processing. Then, the processed data is transmitted (by the MEC servers 104) back to the UE 106 for rendering and display.

The development of holographic communication has seen significant progress in recent years, attracting attention from academia and industry. The critical aspects of holographic communication include the compression of digital holographic data, data transmission requirements, and potential challenges and solutions in achieving truly immersive holographic communication.

The disclosure is directed to an operation that focuses on job scheduling by the cloud server 102 to the MEC servers 104 of the UE 106, which aims to minimize a latency in application such as 3D holographic application. Embodiments of the disclosure proposes to dynamically allocate computation tasks, taking into account network conditions, computational capabilities of the MEC servers, and requirements of the 3D holographic communication application. Embodiments of the disclosure propose efficiently distributing the computation workload among the MEC servers 104, leveraging their proximity to the UE 106, and thus, significantly reducing the overall latency, which would enhance the user experience and pave a way for the widespread adoption of particular applications such as 3D holographic communication applications.

Embodiments of the disclosure propose job scheduling operations, which minimize a total latency in particular applications such as 3D holographic communication applications. Thus, the disclosure contributes to the ongoing efforts to develop efficient and scalable solutions for emerging technologies such as 3D holographic communication.

Figure 2:
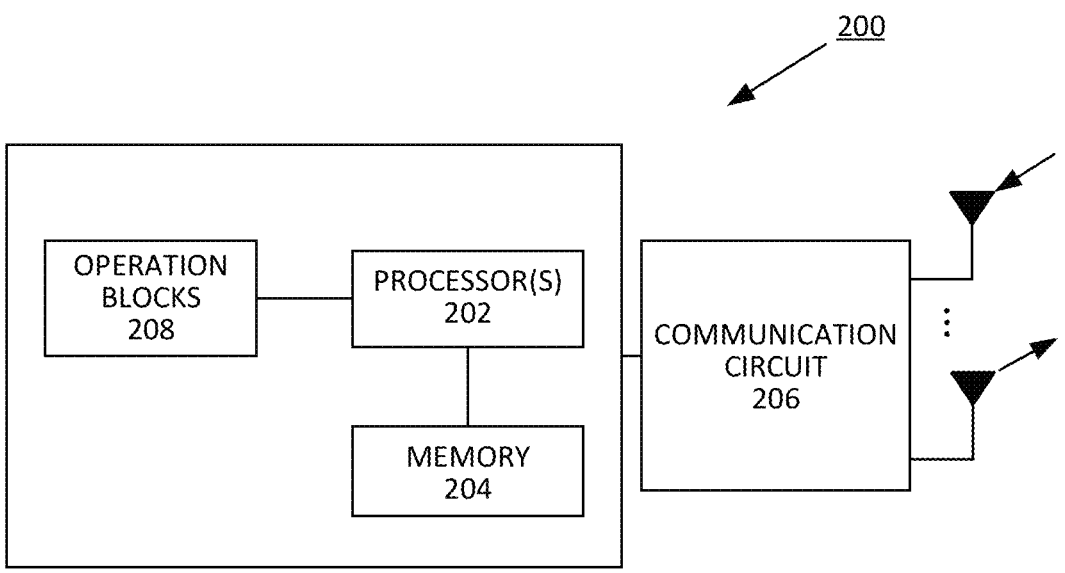
FIG. 2 illustrates example components of an electronic device in accordance with some embodiments of the disclosure.

FIG. 2 illustrates example components of an electronic device 200 in accordance with some embodiments of the disclosure. The electronic device 200 may correspond to the cloud scheduler 102 or the MEC server 104 that are shown in FIG. 1.

In an embodiment, the "processor(s)" 202 (shown in FIG. 2) (hereinafter, may be referred to as 'the processor 202') may be implemented in hardware, software, firmware, or a combination of hardware and software. The processor 202 may be or correspond to one or more processors, such as a central processing unit (CPU), a graphics processing unit (GPU), an application processor (AP), an accelerated processing unit (APU), a neural processing unit (NPU), a tensor processing unit (TCU), a microprocessor, a microcontroller, a digital signal processor (DSP), a field-programmable gate array (FPGA), an application-specific integrated circuit (ASIC), or another type of processing component. The processor 202 may include or one or more processors capable of being programmed to perform at least one function. When the processor 202 includes or corresponds to multiple processors such as a first processor and a second processor, in an embodiment, the first processor performs A, B functions, and the second processor performs C function. In an embodiment, the first processor performs part of A function while the second processor performs the remainder of function A, and B, C functions.

In an embodiment, the memory 204 may include a random access memory (RAM), a read only memory (ROM), and/or another type of dynamic or static storage device (e.g., a flash memory, a magnetic memory, and/or an optical memory) that stores information and/or instructions for use by the processor 202. In an embodiment, the memory 204 may contain information and/or software related to the operation and use of the electronic device 200. For example, the memory 204 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, or another type of non-transitory computer-readable medium, along with a corresponding drive. In some embodiments, the memory 204 may correspond to at least one memory (e.g., one memory or two memories) including computer program code. In some embodiments, the at least one memory and the computer program code are configured, with the at least one processor 202, to cause the electronic device 200 to perform functions described in the disclosure.

In an embodiment, the communication circuit 206 may include a transceiver-like component (e.g., a transceiver and/or a separate receiver and transmitter) that enables the electronic device 200 to communicate with other devices, such as via a wired connection, a wireless connection, or a combination of wired and wireless connections. The communication circuit 206 may permit the electronic device 200 to receive information from another device and/or provide information to another device. For example, the communication circuit 206 may include an Ethernet interface, an optical interface, a coaxial interface, an infrared interface, a radio frequency (RF) interface, a universal serial bus (USB) interface, a Wi-Fi interface, a cellular network interface, or the like. In an embodiment, the communication circuit 206 may be a communication 'interface' used to connect the electronic device 200 with the other devices.

In an embodiment, the electronic device 200 may include operation blocks 208, as shown in FIG. 2. The operation blocks 208 may be implement in software, hardware components, or any combination of the software and the hardware components. The operation blocks 208 may provide the functionality of the electronic device 200 e.g., one or more functions of the cloud scheduler 102 or the MEC server 104 described herein.

Additionally or alternatively, a set of components (e.g., one or more components) of the electronic device 200 may perform one or more functions described as being performed by another set of components of the electronic device 200.

System Model and Problem Formulation

Figure 3:
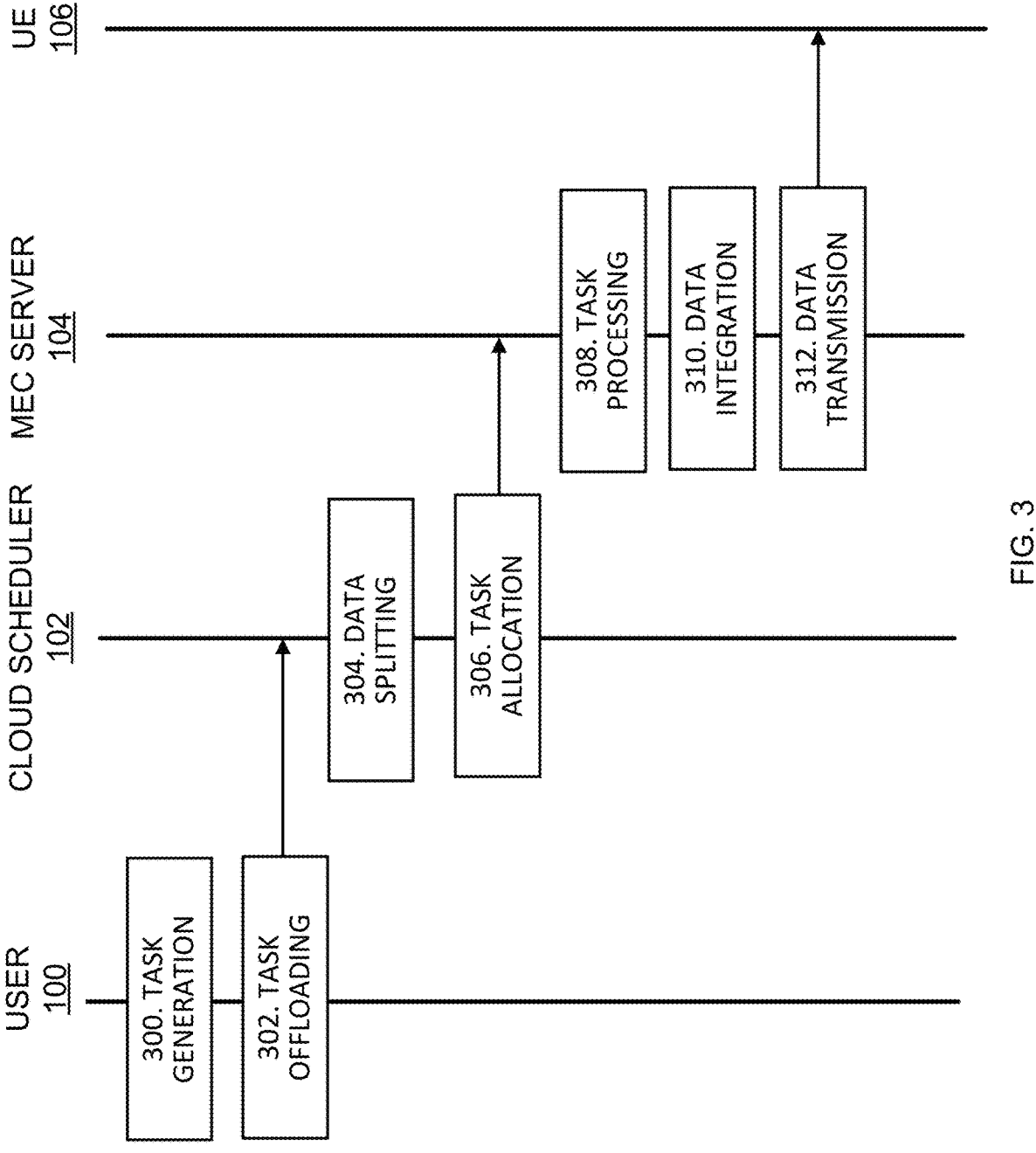
FIG. 3 illustrates a data splitting and processing pipeline involving a cloud scheduler and MEC servers in accordance with some embodiments of the disclosure.

A model for a communication system such as 3D holographic communication system is presented herein. FIG. 3 illustrates a data splitting and processing pipeline of the cloud scheduler 102 and MEC servers 104.

FIG. 3 illustrates a data splitting and processing pipeline involving the cloud scheduler 102 and the MEC servers 104. The data splitting and processing pipeline includes the following operations:

Task generation (operation 300): Users generate data (e.g., 3D holographic communication data) related to an application (e.g., 3D holographic content).

Task offloading (operation 302): The generated data are offloaded to the cloud scheduler 102, which is configured to allocate the data to the MEC servers 104, for example, based on first predetermined operations.

Data splitting (operation 304): The cloud scheduler 102 is configured to split the data into smaller sub-tasks, based on at least one of a network condition, computational capabilities of the MEC servers 104, and a requirement of the application (e.g., the 3D holographic communication application).

Task allocation (operation 306): The cloud scheduler 102 allocates the sub-tasks to the MEC servers 104 using at least one operation of minimizing a latency of the application.

Task processing (operation 308): The MEC servers 104 is configured to process the assigned sub-tasks, based on their computational resources to perform necessary calculations and rendering.

Data integration (operation 310): The processed sub-tasks from the MEC servers 104 are integrated and synchronized by one of the MEC servers 104, which is configured to integrate and synchronize the sub-tasks to assembled data that is ready for transmission to the UE 106.

Data transmission (operation 312): The one of the MEC servers 104 is configured to transmit the assembled data to the UE 106, which is configured to display content (e.g., 3D holographic content in real-time), for example, after rendering the received assembled data.

In an embodiment, in terms of the detailed transmitted data through the communication network, a cloud of points (e.g., a point cloud) at the users 100 are used. The cloud of points about an object (e.g., a person) includes coordinates of points that represent the object (e.g., the person's shape). In an embodiment, the points of the object are a set of data in a 3D coordinate system and each of the points of the object indicate a spatial measurement or location, of a part of an object. A number of points in the cloud depends on a setup of a sensor (for example, included in the electronic device 200).

FIG. 4 illustrates Table 1 showing notations used in the disclosure that is directed to minimize a latency of an application commonly used by the UE 106 and the users 110. In an embodiment, the latency may correspond to a total delay (time values) that includes (1) a communication latency that is a time value being spent transferring data (or subsets of the data) and (2) a computation latency that is a time value being spent on calculations (rendering and integrating process). In other words, the total latency, $l_n$, (for a user n) is a combination of the communication latency and the computation latency, which can be represented as:

$$l_n = \sum_{m \in M} \frac{s_k}{b_{m,n}} + \sum_{k \in K} \sum_{c \in C} \frac{A_{k,c}[t]}{p_{k,c,m}}$$

Expression (1)

In the above Expression (1), the first part, $$\sum_{m \in M} \frac{s_k}{b_{m,n}},$$

represents the communication latency and the second part, $$\sum_{k \in K} \sum_{c \in C} \frac{A_{k,c}[t]}{p_{k,c,m}},$$

represents the computation latency.

In the above Expression (1), the following conditions may exist. For a MEC server m, the computing capacity $p_{k,c,m}$ may need to be sufficient to process the class-k data with operation c. A bandwidth of a link between the MEC servers 104, $b_{m_1,m_2}$, may need to be sufficient to support the data transfer between the MEC servers 104. The bandwidth of the link between the MEC servers 104 and the users 100, $b_{m,n}$, may need to be sufficient to support the data transfer between them.

In an embodiment, a system, which implements the above Expression (1), may transfer the data from the users 100 to the cloud scheduler 102, then to the MEC servers 104. Next, data and corresponding tasks may be split (by the cloud scheduler 102) and integrated across the MEC servers 104 for an optimization process, which would improve the performance in terms of minimizing total computation and communication of UE.

Proposed Task Scheduling Operations

The disclosure proposes two task scheduling operations, namely, a first task scheduling operation (LP1) and a second task scheduling operation (LP2). The first task scheduling operation (LP1) focuses on finding a minimized maximum latency among users (the users 100 and the UE 106), and at the same time, the second task scheduling operation (LP2) aims to minimize a number of splits (of the tasks) with respect to the maximum latency obtained from the first task scheduling operation (LP1). Combining these two task scheduling operations may allow for a fair allocation of tasks to the MEC servers 104 and may provide a balanced Quality of Service (QoS) to the users 100.

The first task scheduling operation (LP1) is directed to find the minimized maximum latency among the users 100 and limit the maximum total latency among all users' data to $l_{max}$. In an embodiment, the first task scheduling operation (LP1) is expressed as below:

$$\text{minimize } l_{max}$$

Expression (2A)

$$\text{subject to } l_n \leq l_{max}, \forall n \in N$$

$$\sum_{m \in M} \frac{s_k}{b_{m,n}} + \sum_{k \in K} \sum_{c \in C} \frac{A_{k,c}[t]}{p_{k,c,m}} \leq l_n, \forall n \in N$$

Expression (2B)

$$l_n \geq 0, \forall n \in N$$

Expression (2C)

In other words, in order to find the minimized maximum latency ($l_{max}$), there are three conditions that may need to be met:

The first condition (Expression (2A)) is that a total latency for a user does not exceed the maximum total latency.

The second condition (Expression (2B)) is that the total latency for the user is calculated as being higher than or equal to the sum of the communication latency and the computation latency (the total latency).

The third condition (Expression (2C)) that the total latency for the user is higher than or equal to zero. The searched minimized maximum latency may be subject to these three conditions.

The second task scheduling operation (LP2) aims to minimize a number of the splits (of the tasks) regarding $l_{max}$, which means that the splits do not exceed $l_{max}$ but allow the same or lower latency. An objection of the second task scheduling operation (LP2) is to decrease synchronization and integration overhead and to increase the robustness of the overall system. In an embodiment, the second task scheduling operation (LP2) is expressed as below:

$$\text{minimize } t_n \qquad \text{Expression (3A)}$$

$$\text{subject to } l_n \le l_{max}, \forall\, n \in N$$

$$\sum_{m \in M} \frac{s_k}{b_{m,n}} + \sum_{k \in K} \sum_{c \in C} \frac{A_{k,c}[t]}{p_{k,c,m}} \le l_n, \forall\, n \in N \qquad \text{Expression (3B)}$$

$$l_n \ge 0, t_n \ge 0, \forall\, n \in N \qquad \text{Expression (3C)}$$

In other words, in order to minimize the number of the split, there are three conditions that may need to be met:

The first condition is that a total latency for the user does not exceed the minimized maximum total latency $l_{max}$.

The second condition is that the total latency for the user is calculated as being higher than or equal to the sum of the communication latency and the computation latency.

The third condition is that the total latency and the number of the splits (of the tasks) for the user is higher than or equal to zero. The searched minimized number of splits is subject to these three constraints.

Running those two task scheduling operations (LP1 and LP2) may result in a fair allocation of tasks to the MEC servers 104 and fair QoS regarding the performance on all the users 100. A reason for using those two task scheduling operations (LP1 and LP2), instead of only optimizing the final total latency, is to consider the fairness and balancing of loads for all the users 100. When only one user exists, the second task scheduling operation (LP2) would not affect the result. When multiple users exist, the second task scheduling operation (LP2) achieves a balance of the total latency among all the users 100 while keeping the maximum latency below a target value. In this way, all the users 100 may share the exact value of the total latency, which lowers the overhead on task splitting and data synchronization, therefore, benefits the performance on an even larger scale.

Figure 5:
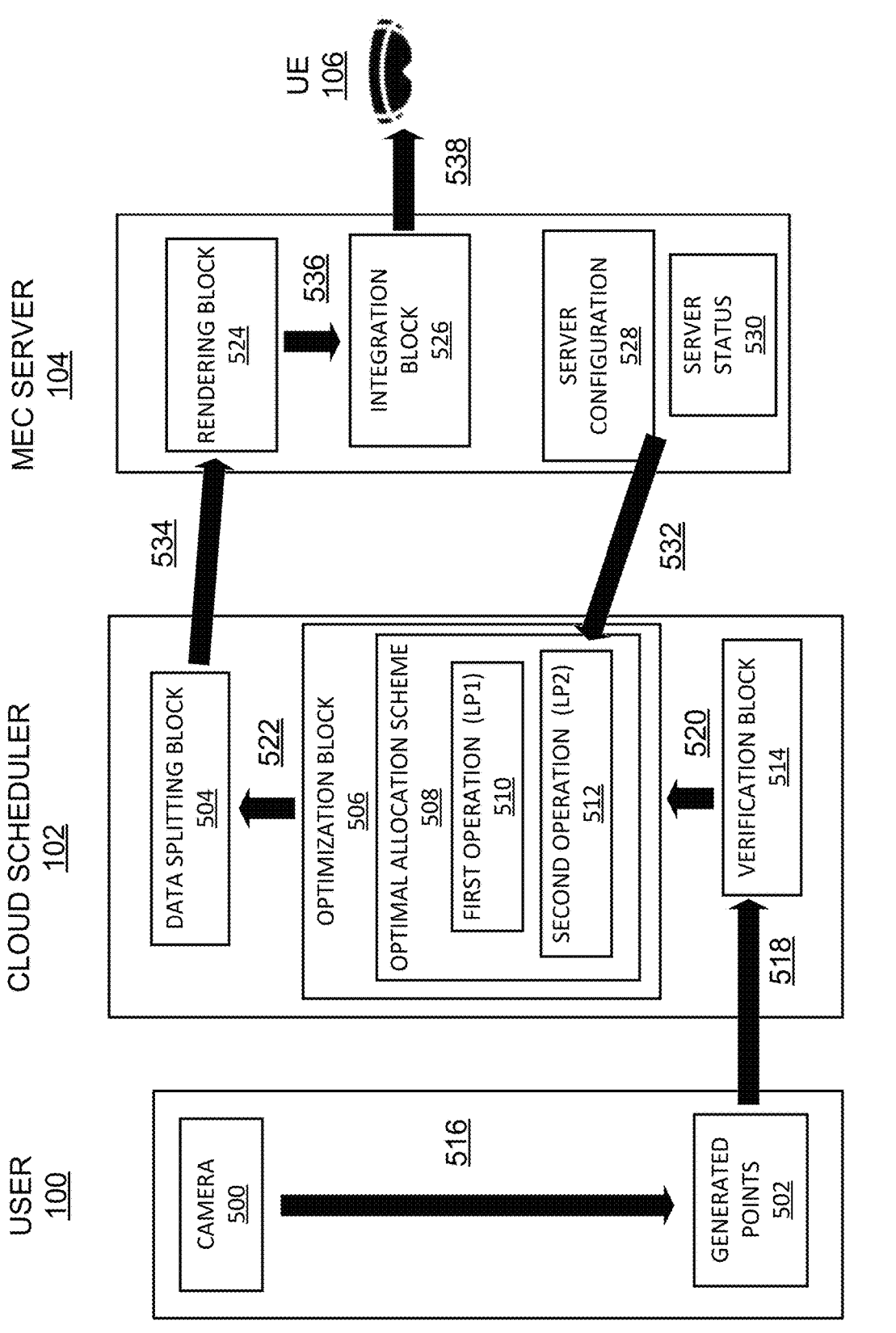
FIG. 5 illustrates an overall structure of a system including user, the cloud scheduler, and the MEC server in accordance with some embodiments of the disclosure.

FIG. 5 illustrates an overall structure of a system including the user 100, the cloud scheduler 102, and the MEC server 104 in accordance with some embodiments of the disclosure. The functional blocks shown in FIG. 5 may be implemented by hardware, software, firmware, or any combinations thereof.

In operation 516, the camera 500 of the user 100 captures images and generates points 502 (of cloud) based on the captured images.

In operation 518, the generated points 502 are delivered to the verification block 514 of the cloud scheduler 102. Then, the verification block 514 verifies whether the generated points 502 are accurate and legitimate.

In operation 520, the verified points are delivered from the verification block 514 to the optimization block 506, which includes the optimal allocation scheme 508.

In operation 532, the optimal allocation scheme 508 receives the server configuration 528 and the server status 530 from the MEC server 104. The optimization block 506 (of cloud scheduler 102) performs the first operation (LP1) 510 and the second operation (LP2) 512, for example, using the server configuration 528 and the server status 530.

In operation 522, the optimization block 506 provides results of the second operation (LP2) (optionally, the results of the first operation (LP1)) to the data splitting block 504. The data splitting block 504 of the cloud scheduler 102 performs splitting of data (or tasks of the data) for the user 100.

In operation 534, the data splitting block 504 of the cloud scheduler 102 transmits the split data (or the tasks of the data) to the MEC server 104, in particular to the rendering block 524.

In operation 536, the rendering block 524 transmits the split and rendered data (or the tasks of the data) to the integration block 526 that integrates the split and the rendered data (or the tasks of the data).

In operation 538, the integration block 526 transmits the integrated data (or the tasks of the data) to the UE 106.

FIG. 6 illustrates example operations performed by the system the user 100, the cloud scheduler 102, and the MEC server 104 in accordance with some embodiments of the disclosure.

In operation 600, the user 100 generates points of a cloud.

In operation 602, the user 100 transmits the generated points to the cloud scheduler 102.

In operation 604, the cloud scheduler 102 performs a splitting of the generated points into (smaller) subsets of the generated points.

In operation 606, the cloud scheduler 102 reduces (or optimizes) a total latency (the communication latency and the computation latency) of the system by respectively allocating the generated subsets to a plurality of MEC servers 104.

In operation 608, the plurality of MEC servers 104 process the allocated subsets.

In operation 610, the cloud scheduler 102 receives the processed subsets from the plurality of MEC servers 104, and then, generates data by integrating and synchronizing the received subsets.

In operation 612, the cloud scheduler 102 transmits the generated data to the user 100.

FIG. 7 illustrates a first set of example operations performed by the cloud scheduler 102 in accordance with some embodiments of the disclosure.

In operation 700, the cloud scheduler 102 receives, from the user 100, points of a cloud related to an application. In an embodiment, the application corresponds to an XR application.

In operation 702, the cloud scheduler 102 receives, from the MEC servers 104, computing capacities of the MEC servers 104.

In operation 704, optionally, the cloud scheduler 102 analyzes correctness of the points received from the user 100. Optionally, the cloud scheduler 102 checks availabilities of the MEC servers 104. Although the optional operation 704 is illustrated in FIG. 7 as an operation performed before operation 706 is performed, in some embodiments, the optional operation 704 may be performed at the same time when operation 706 is performed or after operation 706 is performed.

In operation 706, the cloud scheduler 102 estimates a total latency that corresponds to a sum of a communication latency and a computation latency, based on the (received) points of the cloud and the (received) plurality of computing capacities. In an embodiment, the communication latency corresponds to a time value being spent transferring the points or the subsets in the wireless communication system. In an embodiment, the computation latency corresponds to a time value being spent on rendering and integrating the points or the subsets.

In operation 708, based on the (estimated) total latency of the system, the cloud scheduler 102 performs a first operation (LP1) of finding a minimized maximum latency ($l_{max}$) among a plurality of users 100 including the user 100 of operation 700. In an embodiment, the first operation of finding the minimized maximum latency ($l_{max}$) (or, of minimizing the $l_{max}$) among the plurality of users includes maintaining a latency for the user 100 not to exceed the maximum latency ($l_{max}$) among the plurality of users 100;

calculating the latency for the user 100 as being higher than or equal to the estimated total latency; calculating the latency for the first user as being higher than or equal to zero.

In operation 710, the cloud scheduler 102 performs a second operation (LP2) of minimizing a number of splits of the (received) points, based on the (found) minimized maximum latency ($l_{max}$). In one embodiment, the second operation (LP2) includes: maintaining the latency for the user 100 as being lower than or equal to the minimized maximum latency ($l_{max}$); calculating the latency for the user 100 as being higher than or equal to the total latency, and calculating the total latency as being higher than or equal to zero.

In operation 712, based on the minimized maximum latency ($l_{max}$) and the minimized number of splits, the cloud scheduler 102 performs a splitting of the points into subsets (of data) and allocates the split subsets to the plurality of MEC servers 104, respectively. In an embodiment, the optional operation 704 may be performed before operation 712 is performed.

One or more embodiments as set forth herein may be implemented as software including one or more instructions that are stored in a storage medium that is readable by a machine. For example, a processor of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

According to one or more embodiments, in a non-volatile storage medium storing instructions, the instructions may be configured to, when executed by at least one processor, cause the at least one processor to perform at least one operation. The at least one operation may include displaying an application screen of a running application on a display, identifying a data input field included in the application screen, identifying a data type corresponding to the data input field, displaying at least one external electronic device, around the electronic device, capable of providing data corresponding to the identified data type, receiving data corresponding to the identified data type from an external electronic device selected from among the at least one external electronic device through a communication circuit, and entering the received data into the data input field.

The embodiments of the disclosure described in the present specification and the drawings are only presented as specific examples to easily explain the technical content according to the embodiments of the disclosure and help understanding of the embodiments of the disclosure, not intended to limit the scope of the embodiments of the disclosure. Therefore, the scope of one or more embodiments of the disclosure should be construed as encompassing all changes or modifications derived from the technical spirit of one or more embodiments of the disclosure in addition to the embodiments disclosed herein.

What is claimed is:

1. A method performed by an electronic device of a wireless communication system, the method comprising:
    receiving, from a first user, points of a cloud related to an application;
    receiving, from a plurality of mobile edge computing (MEC) servers, a plurality of computing capacities of the plurality of MEC servers;
    estimating a total latency of the wireless communication system, based on the points of the cloud and the plurality of computing capacities;
    performing a first operation of minimizing a maximum latency (lmax) among a plurality of users comprising the first user, based on the total latency;
    performing a second operation of minimizing a number of splits of the points, based on the minimized maximum latency (lmax); and
    based on the minimized maximum latency (lmax) and the minimized number of splits, performing a splitting of the points to a plurality of subsets and allocating the plurality of subsets to the plurality of MEC servers, respectively.

2. The method of claim 1, further comprising analyzing correctness of the points received from the first user.

3. The method of claim 1, further comprising checking availability of the plurality of MEC servers before the estimating the total latency.

4. The method of claim 1, further comprising checking availability of the plurality of MEC servers before the allocating the split subsets to the plurality of MEC servers, respectively.

5. The method of claim 1, wherein the total latency corresponds to a combination of a communication latency and a computation latency, wherein the communication latency corresponds to a time value being spent transferring the points or the subsets in the wireless communication system, and wherein the computation latency corresponds to a time value being spent on rendering and integrating the points or the subsets.

6. The method of claim 5, wherein the first operation of minimizing the maximum latency (lmax) among the plurality of users comprises:

maintaining a second latency for the first user as being lower than or equal to the maximum latency (lmax) among the plurality of users, calculating the second latency for the first user as being higher than or equal to the total latency, and calculating the second latency for the first user as being higher than or equal to zero.

7. The method of claim 6, wherein the second operation of minimizing the number of splits of the points, based on the minimized maximum latency (lmax), comprises:

maintaining the second latency for the first user as being lower than or equal to the minimized maximum latency (lmax), calculating the second latency for the first user as being higher than or equal to the total latency, and calculating the total latency as being higher than or equal to zero.

8. The method of claim 1, wherein the application corresponds to an extended reality (XR) application.

9. An electronic device of a wireless communication system, the electronic device comprising: at least one processor; and at least one memory comprising computer program code, wherein the at least one memory and the computer program code are configured, with the at least one processor, to cause the electronic device to at least:

receive, from a first user, points of a cloud related to an application;

receive, from a plurality of mobile edge computing (MEC) servers, a plurality of computing capacities of the plurality of MEC servers;

estimate a total latency of the wireless communication system, based on the points of the cloud and the plurality of computing capacities;

perform a first operation of minimizing a maximum latency (lmax) among a plurality of users comprising the first user, based on the total latency;

perform a second operation of minimizing a number of splits of the points, based on the minimized maximum latency (lmax); and based on the minimized maximum latency (lmax) and the minimized number of splits, perform a splitting of the points to a plurality of subsets and allocate the plurality of subsets to the plurality of MEC servers, respectively.

10. The electronic device of claim 9, wherein the at least one memory and the computer program code are further configured, with the at least one processor, to cause the electronic device to analyze correctness of the points received from the first user.

11. The electronic device of claim 9, wherein the at least one memory and the computer program code are further configured, with the at least one processor, to cause the electronic device to check availability of the plurality of MEC servers before the total latency is estimated.

12. The electronic device of claim 9, wherein the at least one memory and the computer program code are further configured, with the at least one processor, to cause the electronic device to check availability of the plurality of MEC servers before the split subsets are allocated to the plurality of MEC servers, respectively.

13. The electronic device of claim 9, wherein the total latency corresponds to a combination of a communication latency and a computation latency, wherein the communication latency corresponds to a time value being spent transferring the points or the subsets in the wireless communication system, and wherein the computation latency corresponds to a time value being spent on rendering and integrating the points or the subsets.

14. The electronic device of claim 13, wherein the first operation of minimizing the maximum latency (lmax) among the plurality of users comprises:

maintaining a second latency for the first user as being lower than or equal to the maximum latency (lmax) among the plurality of users, calculating the second latency for the first user as being higher than or equal to the total latency, and calculating the second latency for the first user as being higher than or equal to zero.

15. The electronic device of claim 14, wherein the second operation of minimizing the number of splits of the points, based on the minimized maximum latency (lmax), comprises:

maintaining the second latency for the first user as being lower than or equal to the minimized maximum latency (lmax), calculating the second latency for the first user as being higher than or equal to the total latency, and calculating the total latency as being higher than or equal to zero.

16. The electronic device of claim 9, wherein the application corresponds to an extended reality (XR) application.

* * * * *